Patented Feb. 1, 1938

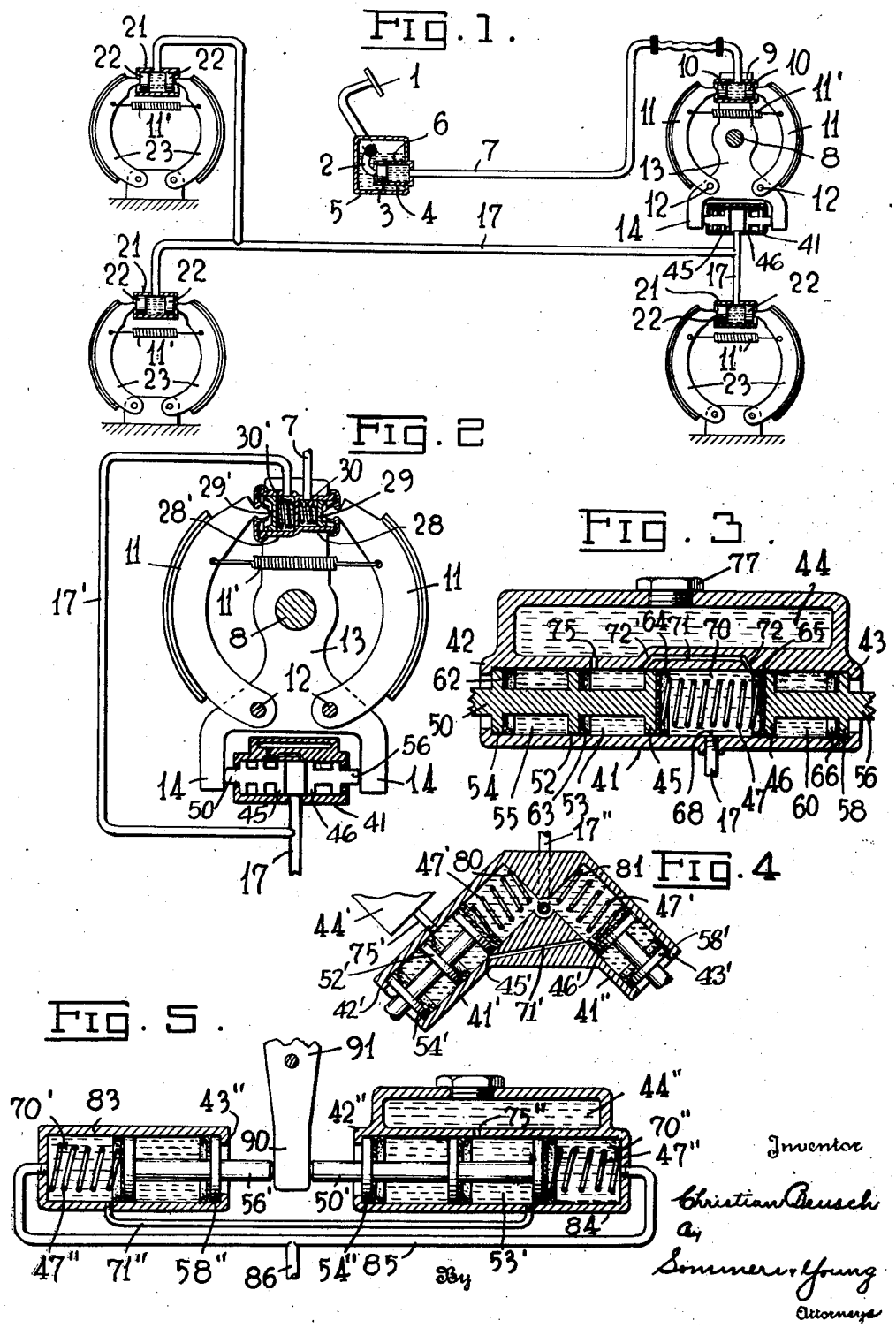

2,107,257

UNITED STATES PATENT OFFICE 2,107,257

HYDRAULIC BRAKE

Christian Beusch, Wadenswil, Switzerland

Application September 19, 1935, Serial No. 41,322

5 Claims. (Cl. 188—152)

This invention relates to vehicle brakes of the hydraulically actuated type and especially to improvements in parts of the brake system disclosed in my application Serial Number 33,906, filed July 30, 1935. In said prior application I have disclosed vehicle braking methods and devices in which two liquid systems are involved. The primary system is actuated by the operator and serves to apply a braking force to one or both brake shoes of one wheel only. The torque generated by the braking effect of the one wheel is utilized to operate the second liquid system to apply the brakes on the other wheels and possibly one of the brake shoes of the first wheel. The braking effect of the two fluid systems are so correlated that while the first wheel may be locked, the braking force applied to the other wheels is somewhat less than that applied to the first wheel whereby the other wheels can not be locked. This is responsible for very favorable results in many respects, only three of which need be here mentioned. First, the force necessary to be applied by the operator is many times less than would be necessary if all the wheels are braked directly. Second, since only one wheel may be locked skidding and swerving of the vehicle is not caused to any extent. Third, since all but one of the wheels are always braking with rolling friction instead of sliding friction practically the maximum braking effect is obtained.

As previously stated the braking torque of the first wheel is utilized to apply the brakes of the other wheels. This is done by applying the said torque force, whether backward or forward, to a liquid contained in a master chamber or cylinder by means of one or the other of a pair of pistons according to whether the direction of the braking is backward or forward. This pressure is transferred from the said master cylinder throughout the entire secondary fluid system and is utilized at each of the wheels to be braked thereby for applying an equal braking force on each of said wheels.

Now, it is essential to a satisfactory practical operation of such braking arrangements that both of the liquid circuits, primary and secondary, shall at all times be entirely full of the braking liquid, but without excessive pressure. It will be realized that many factors tends to cause variation of the pressure in such systems for instance variations of temperature and atmospheric pressure, wear of the moving parts and possible slight leakage, etc. No matter what may be the cause, such variations of pressure must be promptly corrected.

The problem of maintaining the secondary system full of the braking liquid is somewhat complicated by the fact that the master cylinder or cylinders must be provided with two pistons in order to provide for braking in both directions.

The present invention has for an object to provide a braking arrangement of the kind in question which will at all times be properly supplied with ample force transmission fluid.

A further object of this invention is to provide a master cylinder or cylinders of the secondary liquid circuit of a braking system in which the pistons will consistently return to their fully released position whenever the braking force applied thereto ceases.

A further object of this invention is to provide the master cylinder of the secondary liquid circuit with means for ensuring an adequate supply of force transmission fluid.

Another object of the present invention is to provide master cylinders for secondary circuits in which the forward and backward braking forces are applied in different chambers.

A further object of this invention is to provide simple and efficient forms of master cylinders for vehicle braking systems and to provide means for maintaining them amply supplied with braking fluid.

Further objects and advantages of the invention will be apparent from the following detailed description and drawing of several embodiments representing the invention.

In the accompanying drawing, Fig. 1 is a diagrammatic representation of the type of braking system and apparatus to which the present invention relates;

Fig. 2 is a side view partly in section of parts of the brake applying mechanism of a controlling wheel in which one brake shoe is operated by the secondary liquid circuit.

Fig. 3 is a side sectional view of one embodiment of a master cylinder.

Fig. 4 is a side sectional view of a second embodiment of a master cylinder chamber in which the two pistons operate in different communicating cylinders; and Fig. 5 is a side sectional view of a third embodiment in which the two pistons operate in separate cylinders.

In the vehicle braking system, to which the present invention relates, two liquid systems 7 and 17 are provided. The primary liquid system 7 is directly under the control of the operator who applies pressure to the liquid in system 7 by pressing on pedal 1, which pivots lever 2 to push piston 3 to the right in cylinder 4. This presses the liquid through the primary system 7 into cylinder 9 where it presses pistons 10 apart and brake shoes 11 are forced into contact with an exterior brake drum of a wheel (not shown). Cylinder 4 extends into a liquid container 5, and is provided with a port 6 through which liquid may flow from or to the primary system each time the piston moves to release position, whereby undesired pressure variations in said system are promptly corrected. The primary liquid system is therefore always maintained full and free of undesired pressure regardless of changes in conditions tending to vary its pressure.

The brake shoes or jaws 11 are pivoted at points 12, 12 on a supporting frame 13 and are resiliently drawn toward each other by spring 11'. This frame is mounted on axle 8 and is capable of free rocking movement about the axle in either direction. The cylinder 9 is also mounted on this supporting frame 13. It will be seen that when the brake shoes 11 are moved into braking engagement with the brake drum of the moving wheel a torque will be applied thereto and this will be transmitted to frame 13 through pivots 12 and cylinder 9, and frame 13 will therefore tend to rotate about the axle 8 in the direction of the force applied thereto.

This tendency of frame 13 to rotate is used for applying the brakes of the other wheels of the vehicle and to this end frame 13 is provided with a pair of spaced extensions 14 the inner faces of which engage the ends of operating rods 50, 56 of a pair of pistons or plungers 45, 46 in cylinder 41. Cylinder 41 is securely mounted on a fixed part of the vehicle.

The cylinder 41 is the master cylinder of the secondary liquid system 17, that is to say, pressure exerted on the liquid in cylinder 16 is applied to brake operating cylinders 21 at each of the other wheels to be braked. Cylinder 41 is connected with each of the braking cylinders of the other wheels by conduit system 17 and each of the cylinders 21 applies or releases the associated pivoted brake shoes 23 in accordance with movements of pistons 22 in said cylinders in response to the fluid pressure and as influenced by tension springs 11' connecting the various pairs of shoes.

In the modified construction shown in Fig. 2 of the drawing, only one brake shoe 11 is directly actuated by the primary liquid circuit. The other brake shoe of the controlling wheel is operated by the secondary system. To obtain this result the cylinder 9 of the first described arrangement is substituted by a double cylinder 28 fixed on the upper part of supporting frame 13. This cylinder is divided intermedially by a partition wall so that in effect, it is two cylinders. One of the chambers so provided is connected with the primary liquid system through pipe 7, and a plunger 29 in said cylinder actuates a brake shoe 11. The other chamber 28' of cylinder 28 is connected with the master cylinder 16 of the secondary liquid system through conduit 17'. The other brake shoe 11 of the controlling wheel is actuated by the pressure of the liquid of the secondary system acting on piston 29' in chamber 28'. Shoes 11 are resiliently urged toward each other by interconnecting spring 11'. The chambers of cylinder 28 may contain compression springs 30, 31 interposed between the partition wall and the pistons for urging the pistons into bearing engagement with the outer ends of brake jaws 11. The features of the system of Fig. 2 not shown in the drawing are similar to those of the system of Fig. 1.

In order to maintain the proper volume of liquid in the secondary systems of the above described braking arrangements, in accordance with the present invention the secondary system master cylinder is provided with a liquid supply reservoir and special connections therewith. In Fig. 3 a master cylinder for a secondary system is shown in section and is designated generally by numeral 41. The ends of this cylinder may be turned inwardly as indicated at 42, 43 to provide abutments for pistons or packing members. A liquid reservoir 44 is associated with cylinder 41 and as shown may oe formed integrally therewith if desired. Within the cylinder 41 are arranged a pair of pistons or plungers 45, 46 normally spaced apart. A compression spring 47 yieldingly biases the pistons apart. One of the pistons, for instance piston 45, is attached to a rod 50 which extends into one end of the cylinder and is adapted to receive a working force on its outer end from an arm 14 of the frame 13, similarly as the rods of pistons 15 of Figs. 1 and 2. The rod 50 is provided with a second piston 52 spaced from piston 45, whereby a chamber 53 is formed therebetween. Also a third piston or abutment 54 is formed or attached to rod 50 at a position spaced from piston 52, forming therebetween a chamber 55.

Piston 46 is attached or formed on the end of rod 56 which extends outwardly through the opposite end of the cylinder 41 from the rod 50 and is adapted to be engaged at its outer end and operated by the other arm 14 of frame 13, (see Figs. 1 and 2). This rod is provided with a second piston or abutment 58 spaced from piston 46 and forming therebetween a chamber 60.

When in non-operative position or when the opposite piston is operative the abutment pistons 54 and 58 engage the inwardly turned flanges 42, 43 respectively and limit the outward movement of their associated rods 50 and 56 respectively. The pistons and abutments 54, 52, 45, 46 and 58, which are slightly smaller than the cylinder to allow free sliding therein, are provided on their inner face with sealing devices 62, 63, 64, 65 and 66 respectively for preventing undesired passage of fluid outwardly toward the ends of the cylinder 41.

The space between the inner pistons 45 and 46 is connected with the secondary liquid system 17 through a port 68. When one or the other of the rods 50 or 56 is pushed inwardly, the other is held against yielding by its abutment engaging a flange at the ends of the cylinder and consequently a pressure is generated in the chamber 70 between the inner pistons and transmitted to the secondary liquid system 17.

Chamber 70 is connected with chamber 53 through a conduit 71 formed in the wall of cylinder 41. One end 72 of this conduit opens to chamber 70 closely adjacent piston 46 when in its outer position, whereby a very slight inward movement of piston 46 seals this end of the conduit. The other end 72' of the conduit 71 opens into chamber 52. Chamber 53 also communicates with reservoir 44 by an opening 75 which opens into chamber 53 close to piston 52 whereby a slight inward movement of piston 52 immediately closes opening 75. It is clear that if either rod 50 or 56 moves inwardly communication between reservoir 44 and chamber 70 is immediately interrupted while upon return to its outer position communication is immediately reestablished. Therefore, each time the brakes are released the secondary liquid system is equalized and corrected if necessary to the proper pressure and volume and will at all times be automatically kept at the proper pressure. The reservoir 44 may be filled from time to time through opening 76 closed by stopper 77.

In the embodiment of the invention illustrated in Fig. 4 the principle of operation is quite similar to that of Fig. 3. However the two pistons are disposed in different cylinders 41', 41'' communicating with each other at their inner ends but having their axes angularly disposed with respect to each other. In this case a pair of compression springs 47' are provided and their inner ends, opposite the pistons, abut against abutments 80, 81. The two cylinders are in communication with each other, when the brakes are released, by means of a conduit 71' formed in the cylinder casing, and opening into cylinder 41' at a point immediately in rear of its innermost piston 45', and into cylinder 41'' at a point immediately in front of its innermost piston. The reservoir 44' may be formed separately from the cylinders and communicate therewith by conduit 75' opening into cylinder 41 at a point between pistons 45' and 52'. End sealing and abutment engaging pistons 54' and 58' are provided in this embodiment also, and engage abutments 42' and 43'. This embodiment is otherwise similar to that of Fig. 3 and further description therefore appears unnecessary.

The embodiment shown in Fig. 5 is also similar in principle to that of Fig. 3, but is provided with a pair of separate cylinders and reversed pistons. The working chambers 70' and 70'' of the cylinders 83, 84 respectively are at the outer ends of the cylinders and are in communication through conduit 85. This conduit 85 is in connection with a secondary braking system 86 corresponding to system 17 of Fig. 1 or 17' of Fig. 2. The inner ends of the cylinders are provided with inwardly extending abutment flanges 42'', 43'', against which abutment pistons 54'', 58'' respectively may engage. In this embodiment the rods 50', 56' extend toward each other into or substantially into engagement with an arm 90 of a frame 91 pivotally attached to the axle of the vehicle and influenced by braking torque of a controlling wheel similarly as frame 13 of Figs. 1 and 2. Instead of a pair of arms 14 as on frame 13, only a single arm 90 need be provided on the frame 91.

Chamber 70' communicates with chamber 53' by means of a conduit 71'' which opens into these chambers at points corresponding to the quivalent points in chambers 70 and 53 of Fig. 3 and for the same purpose. Chamber 53' also communicates with a reservoir 44'' through port 75'' when non-operative.

It will be apparent that the connections and principles of operation of each of the above described embodiments are similar, and that in each case the secondary liquid system is put into communication with the pressure and volume equalizing reservoir each time the brakes are fully released. However, immediately upon operation of the mechanism in either direction the reservoir is tightly closed off from the system so that no leakage thereto can occur. The system is thereby maintained in proper working order at all times.

I claim:—

1. A master chamber for vehicle wheel hydraulic brake actuation comprising a cylinder having a pair of pistons, one of said pistons being located in said cylinder having a forward and a rearward packing ring, and having a fluid passage between said rings, a reserve fluid reservoir connected with said fluid passage closely adjacent said rearward packing ring, and a conduit connecting the passage between said rings with a point in the chamber closely adjacent and in front of the other piston, said other piston having a packing ring, whereby the initial part of a brake applying movement of either of said pistons seals the master chamber from the reservoir, and communication between said chamber and reservoir is established each time both pistons move to full release position.

2. A master chamber for hydraulic brake systems for vehicle wheel brakes, comprising a cylinder, oppositely facing pistons in said cylinder, said cylinder and pistons defining a control space of variable capacity, according to the positions of the pistons, means for positively limiting movement of each of said pistons in said cylinder in the directions which expand the control space, means connecting the hydraulic system with said control space, means for moving one or the other of said pistons in a direction to reduce the capacity of said control space depending on the direction of braking of the vehicle, and pressure equalizing and adjusting means for said control space and system comprising a braking fluid reservoir, conduits connecting the reservoir with the control space when both of said pistons are in the position of maximum expansion of the control space and means for interrupting communication between said reservoir and control space when either of said pistons is in a position reducing the capacity of said control space.

3. A master cylinder for hydraulic brakes for vehicle wheels comprising a cylinder, a rod extending into one end of said cylinder, and having three spaced pistons each provided with a sealing ring engaging the inner wall of said cylinder, the space between the inner and intermediate sealing rings constituting a fluid passage, a second rod extending into said cylinder from the opposite end from the first rod, said second rod having two pistons each provided with a sealing ring engaging the inner surface of the cylinder, means to limit the outward movement of said rods, a fluid supply and equalization reservoir, a conduit connecting said reservoir with said cylinder at a point adjacent the passage between the inner and intermediate sealing rings of the first rod and closely adjacent the intermediate ring, the wall of said cylinder having a passage extending from said mentioned passage to a point adjacent the inner side of the sealing ring of the inner piston of the other rod, means yieldingly pressing the rods toward their outermost positions, and a hydraulic system connected with said cylinder at a point intermediate the two inner pistons.

4. A master cylinder for hydraulic brakes for vehicle wheels comprising a casing provided with a pair of cylindrical openings angularly disposed with respect to each other directed toward each other and communicating at their inner ends, a rod extending into one of said openings, said rod having three spaced pistons each provided with a fluid sealing ring engaging the inner wall of the opening in which they are located, the space between the inner and intermediate sealing rings constituting a fluid passage, a second rod extending into the other cylindrical opening, said second rod having two pistons each provided with a sealing ring engaging the inner surface of the opening in which they are located, the outer ends of said openings extending inwardly, the outermost pistons on each of said rods engaging said inward extensions and limiting the outward movement of said rods, a fluid supply and equalization reservoir, a conduit connecting said reservoir with the first mentioned cylindrical opening at a point adjacent the passage between the inner and intermediate sealing rings of the first rod and closely adjacent said intermediate ring, said casing having a passage extending from said first mentioned passage to the second opening at a point closely adjacent the inner side of the sealing ring of the inner piston of the other rod, means yieldingly pressing the rods toward their outermost positions, and a hydraulic system connected with said casing at a point intermediate the two inner pistons.

5. In a master hydraulic pressure chamber for controlling vehicle wheel brakes, a pair of aligned cylinders spaced apart, one of said cylinders having a rod extending thereon from the direction of the other cylinder, said rod having three spaced pistons disposed thereon each of which is provided with a fluid sealing ring, the space between the inner and intermediate sealing rings constituting a fluid passage, the end of said cylinder toward the other cylinder having an inwardly extending flange against which the outer piston abuts to limit the outward movement of said rod, the other end of said first cylinder being closed, a second rod extending into the second cylinder from the direction of the first cylinder, said second rod having two spaced pistons thereon within the second cylinder, each of said pistons having a fluid sealing ring engaging the inner surface of said second cylinder, the end of said second cylinder entered by said second rod having a stop against which the outermost of said two pistons engages to limit the outward movement of said second rod, the other end of said second cylinder being closed, a conduit connecting the opposite ends of said cylinders with each other and with a hydraulic brake system, means for supplying and equalizing fluid in said system, said means comprising a reserve fluid reservoir, a conduit connecting said reservoir with the chamber between the inner and intermediate pistons of the first cylinder at a point closely adjacent the sealing ring of the intermediate piston, and a conduit connecting the said chamber with the second cylinder at a point in front of and closely adjacent the sealing ring of the inner piston thereof, and means disposed between the adjacent ends of said rods for actuating one or the other thereof according to the direction of a braking effect.

CHRISTIAN BEUSCH.